(12) United States Patent
Bartminn et al.

(10) Patent No.: US 11,053,703 B2
(45) Date of Patent: Jul. 6, 2021

(54) SUPPORT STRUCTURE FOR A WIND TURBINE

(71) Applicant: INNOGY SE, Essen (DE)

(72) Inventors: Daniel Bartminn, Elmshorn (DE); Artur Czarnecki, Hamburg (DE); Benjamin Matlock, Hamburg (DE)

(73) Assignee: INNOGY SE, Essen (DE)

( * ) Notice: Subject to any disclaimer, the term of this patent is extended or adjusted under 35 U.S.C. 154(b) by 372 days.

(21) Appl. No.: 16/088,428

(22) PCT Filed: Mar. 31, 2017

(86) PCT No.: PCT/EP2017/057755
§ 371 (c)(1),
(2) Date: Sep. 25, 2018

(87) PCT Pub. No.: WO2017/167990
PCT Pub. Date: Oct. 5, 2017

(65) Prior Publication Data
US 2020/0378364 A1    Dec. 3, 2020

(30) Foreign Application Priority Data

Apr. 1, 2016 (DE) .......................... 102016205447.3

(51) Int. Cl.
*E04H 12/00* (2006.01)
*F03D 13/20* (2016.01)
*E04H 12/08* (2006.01)

(52) U.S. Cl.
CPC ............. *E04H 12/00* (2013.01); *E04H 12/08* (2013.01); *E04H 12/085* (2013.01); *F03D 13/20* (2016.05);

(Continued)

(58) Field of Classification Search
CPC ........ E04H 12/00; E04H 12/08; E04H 12/085
See application file for complete search history.

(56) References Cited

U.S. PATENT DOCUMENTS 3,936,206 A * 2/1976 Meisberger ............. E04H 12/08
403/334
8,209,913 B2 * 7/2012 Murata ................... E04H 12/08
52/40

(Continued)

FOREIGN PATENT DOCUMENTS

DE          19726973 A1    2/1999
DE       102013107059 A1   1/2015

(Continued)

OTHER PUBLICATIONS

"Notice of Grounds for Rejection received for Korean Patent Application No. 10-2018-7031064, dated Aug. 10, 2020", 16 pages (8 pages of English Translation and 8 pages of Official Copy).

(Continued)

*Primary Examiner* — Rodney Mintz
(74) *Attorney, Agent, or Firm* — Wiley Rein LLP (57) ABSTRACT

The invention relates to a support structure, in particular for a wind turbine, having at least two segments, which are joined to one another such that their longitudinal axes extend substantially collinearly to one another. At least one of the segments is a pipe section, which has at least two mutually facing abutment surfaces that are joined to one another, at least in parts. A support structure is provided that is producible in less time and is more cost-effective because the join between the abutment surfaces involves at least one welded join, the thickness of the welding join being less than (Continued)

the wall thickness of the pipe section, and/or the join between the abutment surfaces involves at least one retaining clip.

14 Claims, 6 Drawing Sheets

(52) U.S. Cl.
CPC ... *F05B 2230/232* (2013.01); *F05B 2240/912* (2013.01); *F05B 2260/30* (2013.01)

(56) References Cited

U.S. PATENT DOCUMENTS

| | | | | |
|---|---|---|---|---|
| 8,726,610 | B2* | 5/2014 | Johnston | E04B 1/92 |
| | | | | 52/745.18 |
| 10,273,705 | B2* | 4/2019 | Tuerk | E04H 12/085 |
| 10,641,000 | B2* | 5/2020 | Porm | E02D 27/425 |
| 10,724,203 | B2* | 7/2020 | Matlock | E02D 27/425 |
| 2012/0049529 | A1 | 3/2012 | Murata | |
| 2014/0000180 | A1 | 1/2014 | Moberg | |
| 2014/0059964 | A1* | 3/2014 | Johnston | E04H 12/085 |
| | | | | 52/514 |
| 2018/0179776 | A1* | 6/2018 | Tuerk | F03D 13/20 |
| 2018/0179777 | A1* | 6/2018 | Tuerk | E04H 12/34 |
| 2019/0003199 | A1* | 1/2019 | Porm | E04H 12/085 |
| 2019/0063030 | A1* | 2/2019 | Matlock | F03D 13/22 |

FOREIGN PATENT DOCUMENTS

| | | |
|---|---|---|
| EP | 3070205 A1 | 9/2016 |
| GB | 396745 A | 8/1933 |
| GB | 2143786 A | 2/1985 |
| JP | 2012-077601 A | 4/2012 |
| KR | 10-1242505 B1 | 3/2013 |
| KR | 10-1462863 B1 | 12/2014 |
| WO | 2011/138824 A1 | 11/2011 |

OTHER PUBLICATIONS

Schweißverbindung cited on Wikipedia downloaded on Nov. 29, 2016 with English translation.

International Search Report and Written Opinion dated Jun. 21, 2017 in International Application No. PCT/EP2017/057755, filed Mar. 31, 2017.

International Preliminary Report on Patentability dated May 16, 2018, in International Application No. PCT/EP2017/057755, filed Mar. 31, 2017 (with English translation).

Office Action received for Japanese Patent Application No. 2018-551456, dated May 28, 2020, 5 pages (2 pages of Official copy and 3 pages of English translation).

* cited by examiner

SUPPORT STRUCTURE FOR A WIND TURBINE

RELATED APPLICATIONS

This Application is a § 371 National Stage Application of PCT/EP2017/057755, filed Mar. 31, 2017, which claims priority benefit of German Patent Application No. 102016205447.3, filed Apr. 1, 2016, which applications are incorporated entirely by reference herein for all purposes.

FIELD

The invention relates to a support structure, in particular for a wind turbine, comprising at least two segments which are connected to one another in such a manner that the longitudinal axes thereof run substantially collinearly to one another, wherein at least one of the segments is a pipe section which has at least two mutually facing joining surfaces which are connected to one another at least in sections.

BACKGROUND ART

It is known from the prior art to use support structures or substructures of the type mentioned at the beginning for example as foundation piles, transition sections or as an element of the tower of a wind turbine, in particular for offshore use. The support structures or substructures serve firstly to ensure reliable anchoring of the wind turbine in the ground (seafloor) and secondly to support the nacelle and the rotor.

The previously known support structures are assembled from what are referred to as pipe sections. Each pipe section is produced in turn from one or more metal sheets which are bent in accordance with the shape of the segment to be produced such that metal sheet edges or joining surfaces lying opposite one another in the bent state can be welded to one another.

The welding of the opposite metal sheet edges customarily takes place by means of a longitudinal weld seam which can be formed, for example, as a groove weld on both sides in accordance with EN ISO 2553, table 2, by means of submerged arc welding. The opposite metal sheet edges are, for example, sharpened in the process in order, in the subsequent welding process, to realize a through-welded groove weld on both sides, and therefore connection of the opposite metal sheet edges takes place over the entire wall thickness of the pipe section. Both the preparation of the opposite metal sheet edges and the production of a through-welded groove weld on both sides are time and cost-intensive.

The support structure is subsequently assembled from a multiplicity of correspondingly formed pipe sections by pipe sections bordering on one another being connected on the end sides by means of a respective circular weld seam, in particular a through-welded double V-groove weld, such that the respective longitudinal axes of the pipe sections run collinearly with respect to one another.

Consequently, in order to produce a corresponding support structure, a multiplicity of weld seams having a large overall length are required, as a result of which the production of the support structure turns out to be complicated and cost-intensive. For example, for the production and connection of two segments which each have a height of three meters and a diameter of seven meters, weld seams having an overall length of approx. 28 m (92 ft) are necessary, namely 2×3 m (6.5×10 ft) longitudinal weld seams for connecting the opposite side edges or material edges of the individual pipe sections and an approx. 22 m (72 ft) circular weld seam for the end-side connection of the two segments.

SUMMARY OF THE INVENTION

The present invention is based on the object of providing a support structure which can be produced in a shortened time and which is consequently more cost-effective.

The object on which the present invention is based is achieved by a support structure with the features of the independent claim. Advantageous embodiments are described in the dependent claims.

The object on which the present invention is based is achieved by a support structure, in particular for a wind turbine, comprising at least two segments which are connected to one another in such a manner that the longitudinal axes thereof run substantially collinearly to one another, wherein at least one of the segments is a pipe section which has at least two mutually facing joining surfaces which are connected to one another at least in sections. According to a first aspect, the connection of the joining surfaces has at least one welded joint, wherein the thickness of the welded joint is smaller at least in sections than the wall thickness of the pipe section. Alternatively or additionally to the first aspect, the connection of the joining surfaces according to a second aspect has at least one holding clamp.

Both segments can be designed as a pipe section. The support element can be assembled from a multiplicity of segments.

The connection of the joining surfaces serves to keep the pipe section in shape before and/or after the end-side connection to the segment. The connection here can be such that it can be configured to be removable or releasable temporarily and therefore in particular after an end-side connecting of pipe section and segment.

The provision of a welded joint, in particular a weld seam, the thickness of which is smaller at least in sections than the wall thickness of the pipe section, affords the advantage that, in comparison to solutions which require through-welding over the full wall thickness, the process time and the admission of heat into the component can be reduced. It has surprisingly been shown that even connecting the joining surfaces in partial regions is sufficient in order to reliably keep the pipe section in shape during the production process.

The thickness of the welded joint, in particular of a weld seam, here is the extent of the welded joint along the wall thickness of the pipe section. In other words, both the wall thickness of the pipe section and the thickness of the welded joint are measured in a section transversely with respect to the longitudinal axis, in particular orthogonally to an inner and/or outer casing surface of the pipe section. The wall thickness of the pipe section corresponds to the thickness of the unrolled metal sheet from which the pipe section has been produced by deformation.

The welded joint can consequently be a tack weld which constitutes a means of pre-fixing the pipe section for subsequent handling and connecting operations. After the pipe section has been connected on the end side to a further segment, the tack weld can be removed or can remain on the component.

The welded joint can extend over a partial length, two or more length portions or the entire length of the pipe section. The length of the pipe section is measured here parallel to the longitudinal axis. In particular, a plurality of separate spot welds or one or more longitudinal weld seams can be provided in the region of a partial length, a length portion or along the entire length of the pipe section.

The thickness d1 of the welded joint, as measured in a section transversely with respect to the longitudinal axis, for example of the welding bead of a weld seam, can be less than or equal to ½, preferably less than or equal to ¹⁄₁₀, furthermore preferably less than or equal to ¹⁄₂₀ of the wall thickness d2 of the pipe section, and can accordingly satisfy one of the specifications d1≤0.5*d2, preferably d1≤0.1*d2, furthermore preferably d1≤0.05*d2. The wall thickness of the pipe section can thus be, for example, 100 mm (4 in), while the thickness of the welded joint, for example of the welding bead of a weld seam, is merely 5 mm (0.2 in) or less. The thickness d1 here can be, for example, the weld thickness s in accordance with EN ISO 2553, table 5.

Alternatively or additionally, the joining surfaces according to a second aspect of the invention can be connected to one another via at least one holding clamp. This can be an intermediate section which can be fastened in an integrally bonded or releasable manner in the region of the joining surfaces in order to connect the joining surfaces to one another. The holding clamp serves to hold the pipe section for handling and connecting operations and optionally to hold same in the desired shape in the finished and assembled state. After the pipe section has been connected on the end side to a further segment, the holding clamp can be removed or can remain on the component.

The holding clamp affords the advantage that a continuous longitudinal weld seam can be dispensed with in the region of the joining surfaces and nevertheless the dimensional stability of the pipe section is ensured. The mutually facing joining surfaces can thus have, for example, a distance of one meter from one another, wherein said distance is spanned with the aid of the holding clamp in order to produce a connection between the joining surfaces. It goes without saying that two or more holding clamps can be provided between the joining surfaces.

The holding clamp can be fastened in the region of a respective joining surface by a welded joint, a screw connection, a bolt connection, a rivet connection or a magnetic connection. The welded joint here can be formed, for example, in the manner described above such that no through-welding takes place, but rather the welding merely makes up a partial region of the thickness and/or length of the mutually facing component sections to be connected.

According to a development of the invention, the holding clamp can be enclosed on two sides by the joining surfaces, and/or can end flush with the outer and/or inner casing surface of the pipe section. The holding clamp can thereby be incorporated into the wall geometry of the pipe section without increasing the external dimensions of the component or the required construction space of the pipe section in the ready assembled state.

In order to introduce as few tensile stresses as possible into weld seams which are adjoining or are provided adjacently, the holding clamp can have at least one concave rounded portion, wherein the rounded portion can in particular merge substantially smoothly into the joining surfaces. The rounded portion can be used as a duct for cables, lines, pipes or other holding and/or connection elements and can therefore serve as a passage opening from the surroundings to the interior of the pipe section, and vice versa.

Alternatively or additionally, the holding clamp can have a substantially biconcave shape. Such a biconcave shape is distinguished in particular by two rounded portions which face away from each other and can preferably each merge substantially smoothly into the opposite joining surfaces. In this manner, a holding clamp, which is in each case arranged at a distance from the two end sides of a pipe section, can reduce the transmission of tensile stresses into adjoining or adjacent weld seams on two sides. A biconcave holding clamp can therefore serve in particular for crack prevention or crack limiting between two adjacently arranged weld seams. A widening crack of a weld seam can therefore be interrupted or brought to a standstill in the region of the holding clamp without crack propagation into adjoining weld seams taking place beyond the holding clamp.

According to an advantageous refinement of the support structure, a recess, in particular a rounded portion, is provided in at least one transition region between at least one of the joining surfaces and an end surface of the pipe section. The recess can be shaped in the manner of a section of a circle or ellipse. By means of the recess, a longitudinal weld seam which is optionally provided in the region of the joining surfaces can be relieved of load since the recess forms a distance between the longitudinal weld seam and an end-side circular weld seam, and therefore the longitudinal seam and the circular weld seam do not merge directly into each other. In addition, the weld seams can be subjected on the end side in the region of the recess along their thickness extent to mechanical remachining, in particular by means of cold deformation or hot deformation, in particular forging.

According to a development, at least two, in particular four, recesses can be provided in the support structure, wherein the recesses are in particular assigned to an end surface lying opposite each other. Accordingly, for example, a pipe section can have two recesses which are arranged lying opposite each other in pairs and are assigned to an end surface of said pipe section. The two recesses can be shaped in each case in a longitudinal section in the manner of a quarter circle, wherein the recesses which are arranged lying opposite each other can complement each other in particular to form a semicircle. In the same manner, the recesses arranged lying opposite each other can form half of an ellipse in longitudinal section. Uniform loading and strain relief of a welded joint provided in the region of the joining surfaces can thereby be achieved.

Alternatively or additionally, at least two, in particular four, recesses can be provided in the support structure, wherein the recesses are assigned in particular to opposite end surfaces facing away from one another. Recesses can thus be provided in each case on the two end surfaces of a pipe section in order to relieve an optionally provided longitudinal seam of load.

According to a further refinement of the support structure, at least one recess is spanned at least in sections, in particular completely, by an end surface of an adjacent segment. The recess is therefore bounded in the axial direction by the end side of the adjacent segment. No radial welding of the pipe section to the adjacent segment preferably takes place in the region of the recess, and therefore a circular weld seam is interrupted at this point. The circumferential weld seam length can therefore be reduced with the aid of the recess.

In addition to relieving adjacent or adjoining weld seams of load, a recess provided in the region of the pipe wall can serve, for example, as a cable duct. In order to provide as large a through opening as possible in a support structure, at least one recess can merge at least in sections into a recess of an adjacent segment. The recess of the pipe section and the recess of the adjacent segment, which can likewise be a pipe section, can consequently be arranged in such a manner that they merge into each other in the axial direction and complement each other, for example, to form a through opening which is substantially circular or elliptical in longitudinal section.

In order to be able to save on as much weld seam length as possible circumferentially in the region of the mutually facing end surfaces of two segments, according to a further alternatively or additionally proposed configuration at least two recesses of two adjacent segments are arranged circumferentially at an angular offset with respect to one another, in particular in such a manner that there is no overlapping of the recesses in the axial direction, and the recess of the one segment is bounded or spanned by the assigned end side of the respective other segment.

The welded joint may have been subjected to mechanical remachining in order to increase its strength. According to an advantageous development, the welded joint has residual compressive stresses in a thickness cross section, wherein the residual compressive stresses have been produced in particular by cold forming and/or forging. The introduction of residual compressive stresses into the weld seam reduces the susceptibility to crack formations in the event of tensile loading. When a thickness cross section of the welded joint, in particular of a weld seam, is discussed here, a section transversely with respect to, in particular orthogonally to, the longitudinal axis of the support structure is therefore meant. The residual compressive stresses in the region of the weld seam can be detectable in a known manner and can be estimated, for example, by determining the surface hardness of the seam.

Alternatively or additionally, the welded joint may have been relieved of load by a hole being drilled therein. The weld seam can thus comprise bores or cavities which are arranged in a targeted manner in regions which are susceptible to crack formations because of residual tensile stresses. For example, the transition regions here between a longitudinal seam and an adjoining circular seam can be relieved of load by a core bore, wherein part of the longitudinal seam, in particular the transition region thereof to the basic material, is removed at least in sections.

According to a further refinement of the support structure, a thickening of the pipe wall is provided in regions of the pipe section that are assigned to the joining surfaces. By means of the thickening in the region of or adjoining the joining surfaces, the rigidity of the support structure as a whole can be improved. Furthermore, the tendency of the structure to buckle or to shell bulging can be reduced.

In order to increase the stability and rigidity of the support structure, stabilization elements can be provided within the segments, in particular for stiffening the segments in the radial direction. The stabilization elements can be designed, for example, as struts or webs which, at their opposite ends, in each case lie against the inner casing surface of a segment and stiffen the respective segment in the radial and axial direction. Within a segment, a plurality of struts or stabilization elements, which have a radial offset relative to one another and are arranged in an overlapping manner, for example in a star shape, can be arranged in a cross-sectional way or distributed in the axial direction.

According to a further refinement of the support structure, the joining surfaces can have a distance from one another at least in sections. The pipe section can therefore be formed in the manner of an open profile, such as a C profile or the like, wherein the mutually facing joining surfaces can have, for example, a distance of 1 m (3 ft) or more from one another—in particular with a diameter of the pipe section of 7 m (23 ft) and a length of 3 m (10 ft).

Alternatively or additionally, the support structure can comprise a pipe section, in which the joining surfaces lie at least in sections, in particular substantially completely, on one another. In other words, the joining surfaces can lie "in abutment" and can be directly adjacent to one another. In this case, the joining surfaces can be directly connected to one another in a simple manner with one or more longitudinal weld seams, wherein the longitudinal weld seams can preferably have a smaller thickness than the wall thickness of the pipe section in the region of the joining surfaces. Mutually contacting joining surfaces furthermore afford the advantage that the circular weld seam can be through-welded to an adjoining segment without interruption. In particular in the case of submerged arc welding, a continuous weld seam is advantageous since the seam can be produced without setting down the welding device.

Alternatively or additionally, at least one metal sheet can be arranged between the joining surfaces, wherein the metal sheet in particular extends in a substantially projecting manner into the pipe interior and/or has a substantially L-shaped cross section. The metal sheet can in each case be welded to the joining surfaces, and therefore the joining surfaces are indirectly connected to one another via the metal sheet. For example, it is possible to provide longitudinal weld seams which extend substantially parallel to one another, enclose the metal sheet at least in sections on two sides and each connect to one of the joining surfaces. The metal sheet can serve for holding and guiding cables, lines or pipes and/or for fastening components of corrosion protection systems or maintenance devices.

According to an advantageous development of the support structure, at least one corrosion protection device is arranged between the joining surfaces. This can be an active cathodic corrosion protection system (AKKS). In the case of an open profile structure with joining surfaces arranged at a distance from one another, an (individual) corrosion protection device arranged between the joining surfaces may already be sufficient in order to ensure corrosion protection both for the inner and the outer casing surface of the pipe section. It is therefore not required to fit separate sacrificial or impressed current anodes both for the inner and for the outer region to a respective pipe section, and therefore the arrangement of one or more sacrificial and/or impressed current anodes between the joining surfaces is sufficient for the corrosion protection of the inner and outer casing surface.

It can be provided that an at least one edge rounding is provided in at least one transition region between a joining surface and an end surface of the pipe section, in particular that the welded joint partially or completely fills a region, which is assigned to the edge rounding, of the mutually facing joining surfaces.

Alternatively or additionally, it can be provided that at least one edge rounding is provided in at least one transition region between a joining surface and an inner and/or outer casing surface of the pipe section, in particular that the welded joint partially or completely fills a region, which is assigned to the edge rounding, of the mutually facing joining surfaces.

By means of the edge rounding, the stress concentration in the region of the welded joint can be reduced and the strength of the weld seam increased.

The edge rounding can be such that, as viewed in a cross section or a longitudinal section, a smooth transition is formed between a joining surface and an inner and/or outer casing surface, or a smooth transition is formed between a joining surface and an end surface of the pipe section.

"Smooth" here means that the transition is, for example, designed in a tangentially constant or curvature-constant manner.

According to a further refinement, it can be provided that the wall thickness of the pipe section is formed in a tapered manner in a region adjacent to the joining surfaces, in particular is formed in a tapered manner in a wedge shape in the manner of a bevel. The tapering can be achieved, for example, by a completely through-welded weld seam in the region of the joining surfaces being retrospectively partially abraded, in particular by grinding, abrasive blasting or the like. Alternatively or additionally, the tapering may have already been introduced prior to the welding in a region of the pipe section adjoining the joining surfaces, in particular by deformation and/or mechanical machining.

BRIEF DESCRIPTION OF THE DRAWINGS

The invention will be described in more detail below with reference to drawings illustrating a number of exemplary embodiments. In the drawings, in each case schematically.

DETAILED DESCRIPTION OF THE EMBODIMENTS

Figure 1:
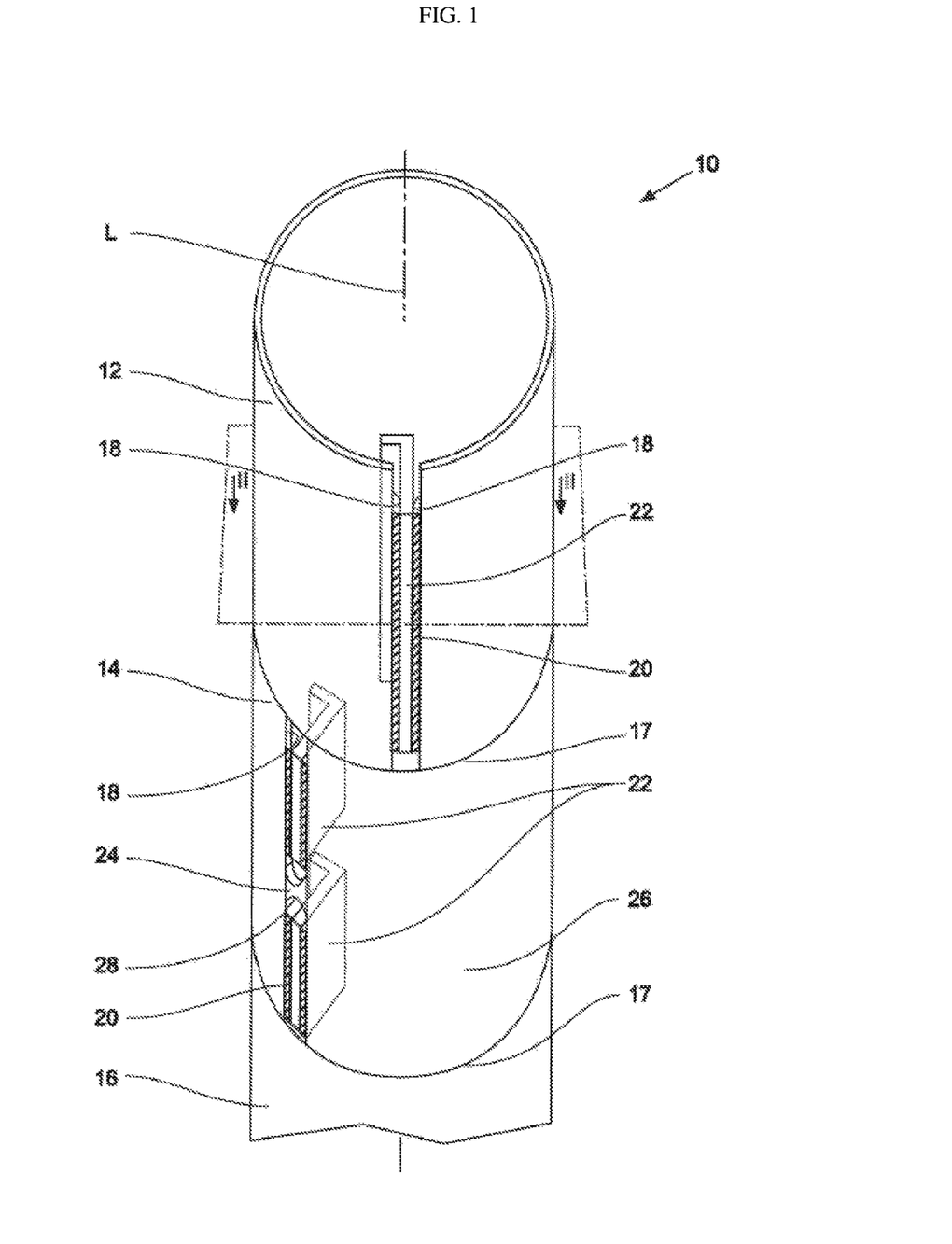
FIG. 1 shows a support structure according to the invention in a perspective view from above.

FIG. 1 shows a support structure 10 according to the invention which is assembled from a plurality of segments 12, 14, 16, wherein only three segments 12, 14, 16 are illustrated by way of example.

The segments 12, 14, 16 are connected to one another on the end sides in such a manner that the longitudinal axes thereof run substantially collinearly with respect to one another and therefore coincide along a common longitudinal axis L. The end-side connection is realized by radial welding of the segments, and therefore the segments are in each case connected to one another via a circular weld seam 17. The radial weld seam 17 can be through-welded on the end sides over the full wall thickness of the segments 12, 14, 16.

The segments 12, 14, 16 are pipe sections and are each produced from a deformed sheet metal blank. In the example illustrated here, the sheet metal thickness t of the segments 12, 14, 16 is in each case approx. 100 mm (4 in).

The segments 12, 14 have mutually facing joining surfaces 18 which are connected to one another via welded joints 20. The connection or coupling of the joining surfaces 18 of the segment 12 takes place indirectly via a metal sheet 22 arranged between the joining surfaces.

The metal sheet 22 is connected on two sides to the joining surfaces 18 in each case via longitudinal weld seams 20. It has a substantially L-shaped cross section and extends in a projecting manner into the pipe interior. According to further embodiments of the support structure, in addition to the metal sheet 22, a corrosion protection device (not illustrated) can alternatively or additionally be provided between the joining surfaces 18.

The respective thickness a of the weld seams 20 is approx. 5 mm (0.2 in) and is therefore smaller than the sheet metal thickness t. The respective thickness a of the weld seams 20, the sheet metal thickness t of the segment 12 and the metal sheet 22 are illustrated in FIG. 2 in a cross section along the plane II, wherein the plane II is oriented orthogonally with respect to the longitudinal axis L.

Figure 2:
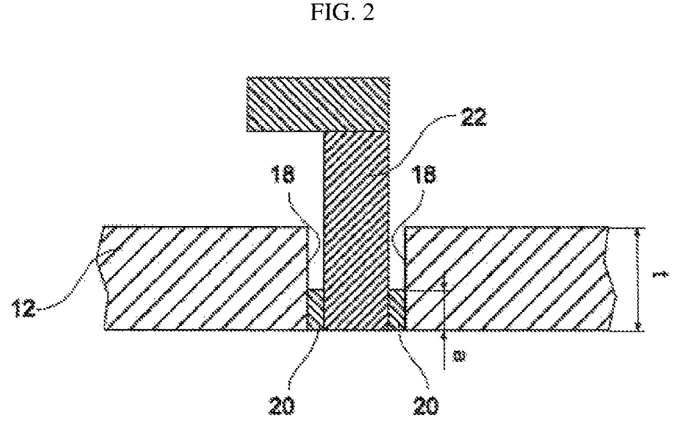
FIG. 2 shows the support structure from FIG. 1 in a cross section from above.

As can be seen from FIG. 2, the weld seams 20 merely cover part of the respectively assigned joining surfaces 18 since the thickness a of the weld seams 20 is smaller than the sheet metal thickness t of the pipe section 12. As already indicated at the beginning, the illustration should merely be understood schematically without the actual size ratios being reproduced true to scale.

In addition to two metal sheets 22, the connection of the joining surfaces 18 of the segment 14 comprises a holding clamp 24 which is arranged between the metal sheets 22 (FIG. 1). The holding clamp 24 is enclosed on two sides by the joining surfaces 18 and ends flush with the inner casing surface (not illustrated) and outer casing surface 26 of the segment 14. The holding clamp 24 is welded to the joining surfaces 18 of the segment 14.

The holding clamp 24 has two concave rounded portions 28 which merge substantially smoothly into the joining surfaces 18, and therefore in particular a step or a shoulder is not provided in the transition from a rounded portion 28 toward the mutually facing joining surfaces 18. The holding clamp 24 has a substantially biconcave shape.

By means of the biconcave shape of the holding clamp 24, adjoining or adjacent weld seams 20 are relieved of load, and therefore in particular the crack formation in the region of the weld seams 20 due to tensile stresses can be counteracted. Furthermore, the holding clamp 24 can serve as a crack limiter. Accordingly, when one of the weld seams 20 of the segment 14 fails, a crack does not continue over the entire length of the segment 14, but rather is interrupted in the region of the holding clamp 24.

In the present case, the holding clamp 24 is permanently incorporated into the support structure 10. According to alternative embodiments, a holding clamp can also be removed after the segments 12, 14, 16 have been connected on the end sides to one another. This creates a larger through opening in order to fasten cables or other add-on parts or to guide same through the pipe wall, or to reduce the weight or to save costs by reusing the holding clamp.

In order to increase the strength of the weld seams 20, in particular in relation to tensile loads, residual compressive stresses have been introduced into the weld seams 20 by cold deformation. Alternatively or additionally, residual compressive stresses can also be introduced into the weld seams by forging.

Figure 3:
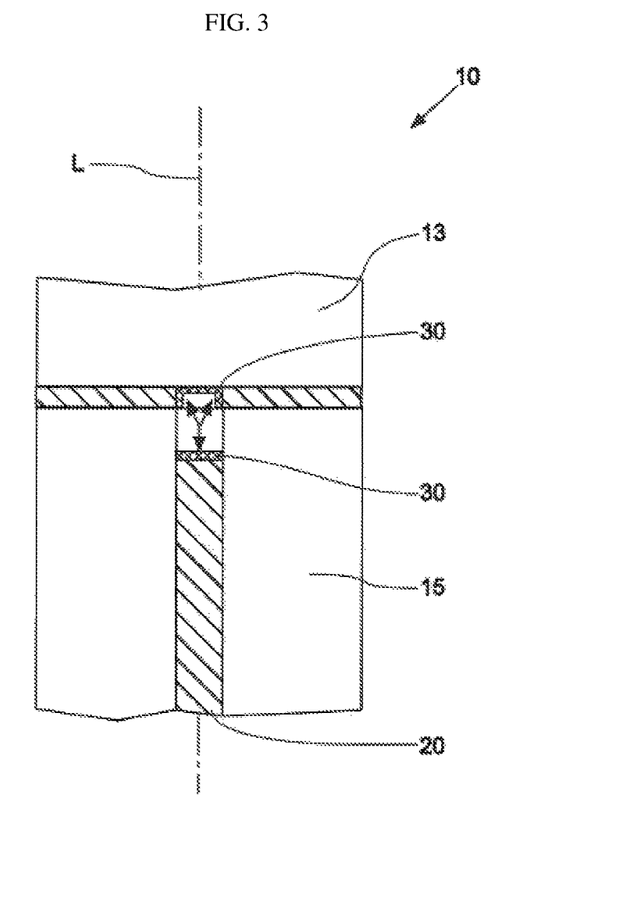
FIG. 3 shows a further support structure according to the invention in a side view.

The residual stresses can be introduced into a weld seam 20 both on the longitudinal side and on the end side, as illustrated by way of example in FIG. 3 for two segments 13, 15. A radial weld seam 21 can be designed here to be continuous or interrupted in the region of the joining surfaces. In the regions 30, the strength of the components has been increased by cold forming. The arrows each indicate the direction of cold forming of the weld seams 20, 21 within the scope of the end-side remachining. It goes without saying that the weld seams 20, 21 can also be remachined over the entire weld seam length circumferentially or on the longitudinal side by cold forming and/or forging.

Figure 4:
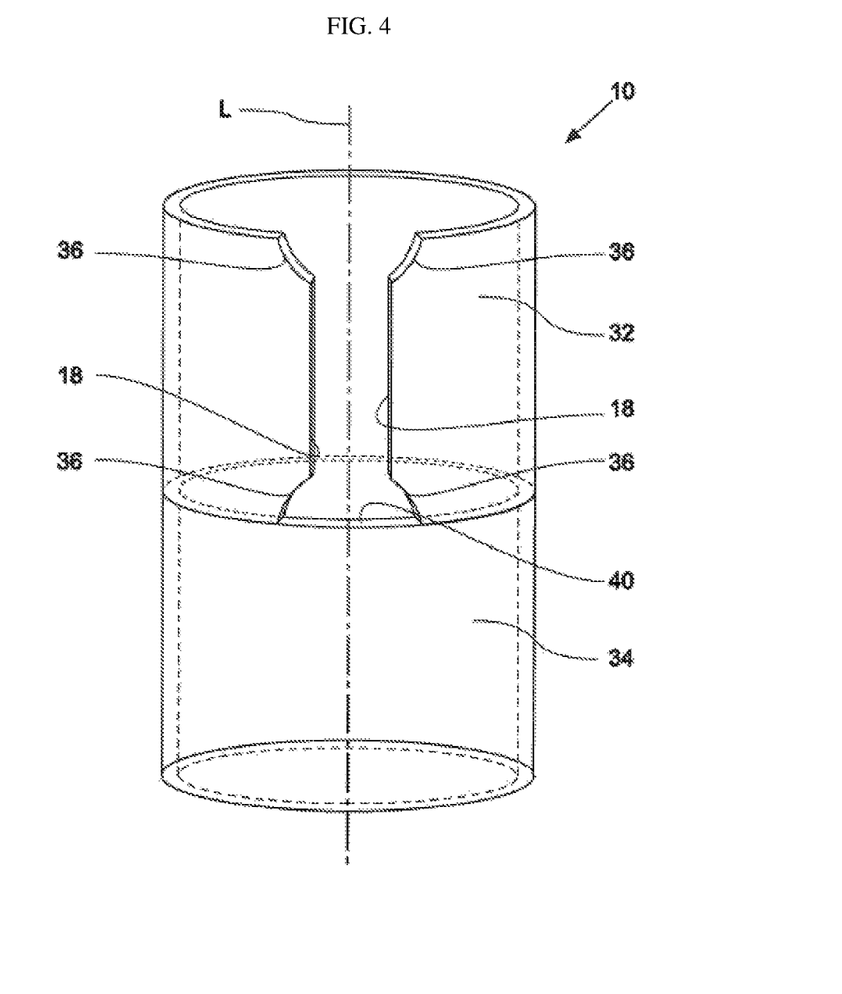
FIG. 4 shows a further support structure according to the invention in a perspective view from above.

FIG. 4 shows a further refinement of a support structure 10 according to the invention, with a pipe section 32 and a segment 34. The pipe section 32 has recesses 36, 38, wherein the recesses 38 are spanned by an end side 40 of the segment 34. The joining surfaces 18 of the pipe section 32 have a distance from one another and can be connected to one another, for example, as per the manner illustrated in FIG. 1 and/or FIG. 2. For the illustration of the recesses 36, 38, the illustration of the connection of the joining surfaces 18 has been omitted for the segment 32. In particular, in alternative refinements of the invention, the joining surfaces 18 can lie directly on one another and can be welded to one another, for example according to FIG. 3, wherein optionally the remachining shown in FIG. 3 can take place.

Figure 5:
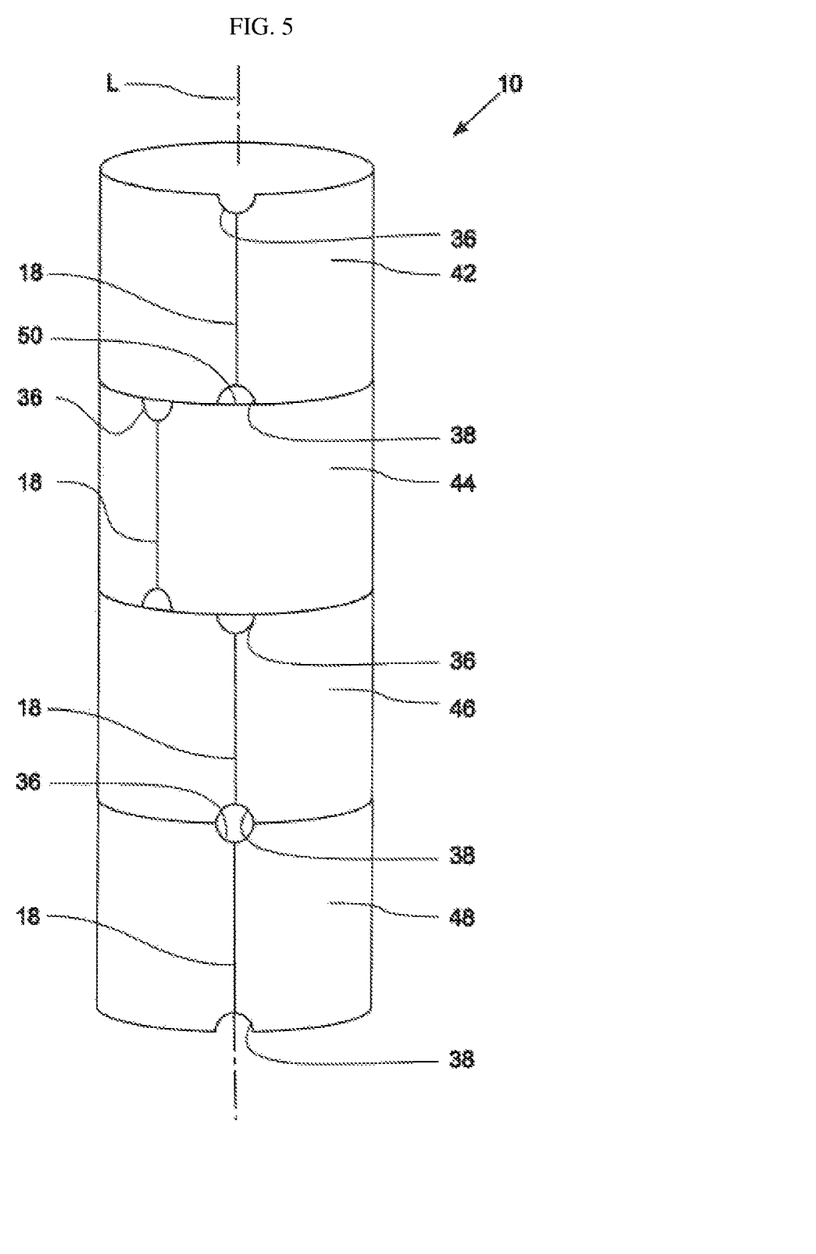
FIG. 5 shows a further support structure according to the invention in a perspective view from above.

A plurality of pipe sections 42, 44, 46, 48 can be combined to form a support structure 10 (FIG. 5). Each of the pipe sections 42, 44, 46, 48 can be configured in the region of the joining surfaces 18 in the manner of FIG. 1, 2, 3 or 4, wherein the arrangement of the recesses 36, 38 is illustrated schematically in FIG. 5.

The recesses 36, 38 can be completely spanned by the end surface of an adjacent segment, and therefore, for example, the recesses 38, which are assigned to the segment 44, of the segment 42 are bounded on the end side, as viewed in the axial direction along the axis L, by the end surface 50 of the segment 44.

Alternatively, the recesses 36, 38 two segments 46, 48 can be arranged without an angular offset with respect to one another and can merge into one another. This can create an enlarged through opening in the support structure 10.

Each of the segments 12, 13, 14, 15, 16, 32, 34, 42, 44, 46, 48 can be combined with further segments 12, 13, 14, 15, 16, 32, 34, 42, 44, 46, 48 to form a support structure 10. In the region of the joining surfaces 18, the segments 12, 13, 14, 15, 16, 32, 34, 42, 44, 46, 48 can have one or more corrosion protection devices (not illustrated), wherein in particular one or more sacrificial and/or impressed current anodes can be positioned between the joining surfaces 18. In addition, in order to avoid buckling or shell bulging, the segments 12, 13, 14, 15, 16, 32, 34, 42, 44, 46, 48 can be stiffened in the radial direction by stabilizing struts (not illustrated), or can have a thickening of the wall thickness in the region of the joining surfaces.

Figure 6:
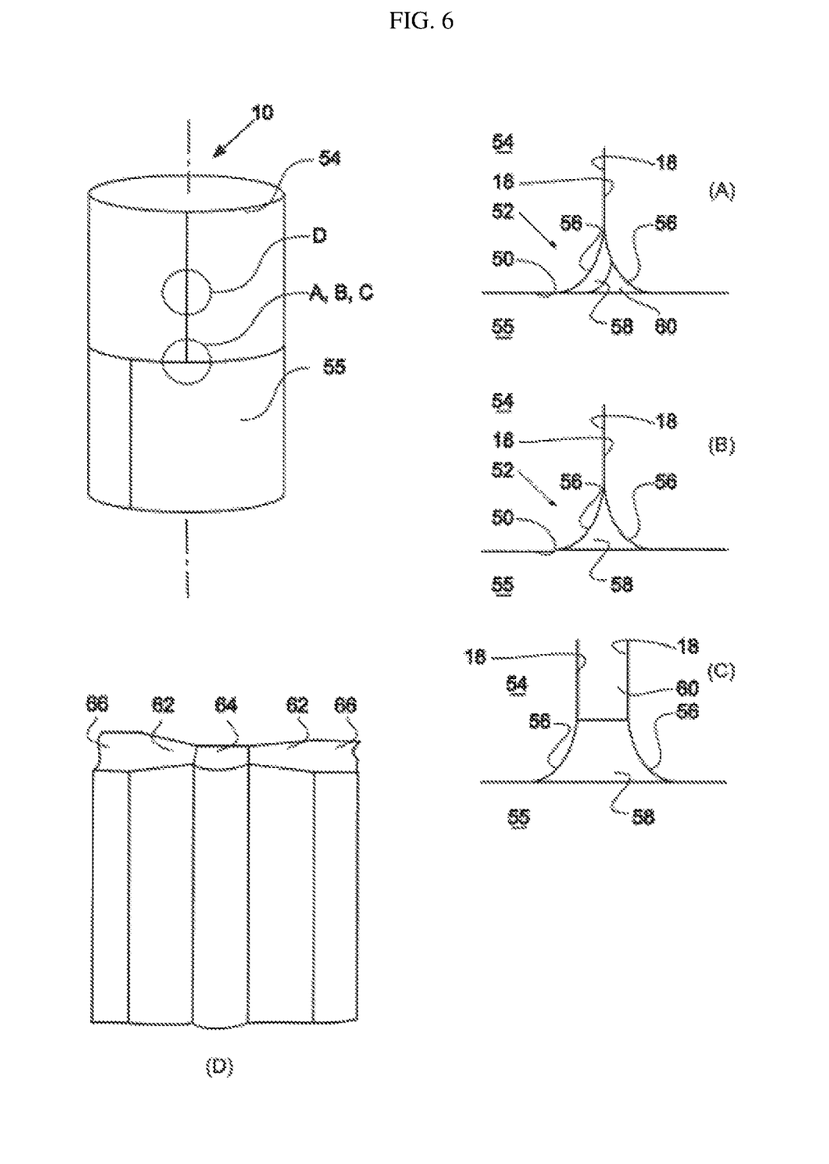
FIG. 6 shows a further support structure according to the invention in a perspective view from above.

FIG. 6 shows a further refinement of a support structure 10 according to the invention. An edge rounding 56 is in each case provided in at least one transition region 52 between a joining surface 18 and an end surface 50 of a pipe section 54. The variants A, B and C show three different configurations of a welded joint 58 provided in this region.

According to variant A, the welded joint 58 fills only part of an intermediate space 60 formed between the joining surfaces 18.

According to variant B, the welded joint 58 completely fills the intermediate space 60 formed between the joining surfaces 18.

According to variant C, the welded joint 58 spans the intermediate space 60, which is formed between joining surfaces 18 that are spaced apart in said variant C, in the region of the edge roundings 56.

The edge rounding 56 forms a smooth transition between joining surfaces 18 and the end surface 50 of the pipe section 54. An adjoining pipe section 55 can likewise have edge roundings.

In the region of the edge rounding 56, the welded joint 58 extends over the entire width of the joining surfaces 18.

The wall thickness of the pipe section 54 is formed tapered in the manner of a bevel in a region 62 adjoining the joining surfaces 18, as can be gathered from detail D.

The tapering 62 has been produced here by a weld seam 64 in the region of the joining surfaces 18 having been partially abraded retrospectively. The weld seam 64 has a smaller thickness than the wall thickness of the pipe section in a non-tapered region 66.

LIST OF REFERENCE SIGNS

10 Support structure
12, 13, 14, 15, Segment/pipe section (of the support structure)
16, 32, 34, 42, Segment/pipe section (of the support structure)
44, 46, 48, 54, 55 Segment/pipe section (of the support structure)
17, 21 Radial weld seam/circular weld seam
18 Joining surfaces
20 Welded joints/longitudinal weld seams
22 Metal sheet
24 Holding clamp
26 Casing surface
28 Rounded portions
30 Region of the cold forming
36, 38 Recesses
40 End side of the segment 34
50 End surface
52 Transition region
56 Edge rounding
58 Welded joint
60 Intermediate space 60
62 Region/tapering/bevel
64 Weld seam
a Thickness of weld seam
t Sheet metal thickness of the segments 12, 14, 16
L Longitudinal axis (of the support structure and of the segments/pipe sections)

The invention claimed is:

1. A support structure for a wind turbine, comprising:
at least two segments which are connected to one another by means of a circular weld seam in such a manner that longitudinal axes thereof run substantially collinearly to one another,
wherein at least one of the segments is a cylindrical pipe element which has at least two mutually facing joining surfaces which are connected to one another at least in sections,
wherein the joining surfaces are connected to one another by means of at least one welded joint, wherein a thickness of the welded joint at least in sections is smaller than a thickness of the joining surfaces such that the welded joint is not coextensive with the joining surfaces.

2. The support structure of claim 1, wherein
the welded joint has residual compressive stresses in a thickness cross section, wherein the residual compressive stresses have been produced by cold forming, forging, or combinations thereof,
wherein the welded joint has been optionally relieved of load by a hole being drilled therein.

3. The support structure of claim 1, further comprising:
at least one edge rounding provided in at least one transition region between the joining surface and an end surface of the pipe element,
at least one edge rounding provided in at least one transition region between one of the joining surfaces and at least one of an inner casing surface or an outer casing surface of the pipe element,
or combinations thereof.

4. The support structure of claim 1, wherein the wall thickness of the pipe element is formed in a tapered manner in a region adjacent to the joining surfaces.

5. The support structure of claim 1, wherein the joining surfaces are connected to one another by means of at least one holding clamp.

6. The support structure of claim 1, wherein a recess is provided in at least one transition region between at least one of the joining surfaces and an end surface of the pipe element.

7. A support structure for a wind turbine, comprising:
- at least two segments which are connected to one another in such a manner that longitudinal axes thereof run substantially collinearly to one another,
- wherein at least one of the segments is a cylindrical pipe element which has at least two mutually facing joining surfaces which are connected to one another at least in sections,
- wherein the joining surfaces are connected to one another by means of at least one holding clamp, wherein a fillet recess is provided in at least one transition region between at least one of the joining surfaces and an end face of the pipe element.

8. The support structure of claim 5 or 7, wherein the holding clamp is characterized by at least one of the following:
- is enclosed on two sides by the joining surfaces, or
- ends flush with at least one of the outer or inner casing surface of the pipe element, or combinations thereof.

9. The support structure of claim 5 or 7, wherein the holding clamp comprises at least one of the following:
- at least one concave rounded portion, wherein the rounded portion merges substantially smoothly into the joining surfaces,
- a substantially biconcave shape, and
- combinations thereof.

10. The support structure of claim 6 or 7, wherein at least two recesses are provided, wherein the recesses
- are assigned to at least one of an end surface lying opposite each other,
- or opposite end surfaces facing away from each other.

11. The support structure of claim 6 or 7, wherein the recess is characterized by at least one of the following:
- at least one recess is spanned at least in sections, by an end surface of an adjacent segment,
- at least one recess merges at least in sections into a recess of an adjacent segment,
- at least two recesses of two adjacent segments are arranged circumferentially at an angular offset with respect to one another, or
- combinations thereof.

12. The support structure of claim 1 or 7, wherein a thickening of a pipe wall is provided at least in sections in regions of the pipe element that are assigned to the joining surfaces.

13. The support structure of claim 1 or 7, wherein
- the joining surfaces are at a distance from one another, lie against one another at least in sections, or combinations thereof,
- wherein at least one metal sheet is optionally arranged between the joining surfaces, wherein the metal sheet is characterized by at least one of the following:
- extends in a substantially projecting manner into a pipe interior,
- has a substantially L-shaped cross section, or
- combinations thereof.

14. The support structure of claim 1 or 7, wherein at least one corrosion protection device is arranged between the joining surfaces.

* * * * *